United States Patent [19]

Burns

[11] Patent Number: 5,005,281

[45] Date of Patent: Apr. 9, 1991

[54] METHOD OF MAKING ROTOR AND STATOR POLE ASSEMBLIES BY STAMPING MAGNETIC PLATE

[75] Inventor: William Burns, Oakville, Canada

[73] Assignee: Dynamics Systems International Inc., Concord, Canada

[21] Appl. No.: 569,427

[22] Filed: Aug. 20, 1990

[51] Int. Cl.⁵ ............... H02K 15/02; B21D 31/02
[52] U.S. Cl. ............................. 29/596; 29/415; 29/598; 29/904; 29/DIG. 37; 72/327; 310/42
[58] Field of Search ............... 29/596, 597, 598, 736, 29/738, 412, 415, 564.2, 609, 904, DIG. 37, 557, 558; 72/326, 327, 379; 310/42, 216, 217, 263, 268

[56] References Cited

U.S. PATENT DOCUMENTS

| | | | |
|---|---|---|---|
| 3,610,979 | 10/1971 | Thomas | 310/263 X |
| 4,728,842 | 3/1988 | Martin | 29/596 X |
| 4,801,832 | 1/1989 | Neumann | 310/42 X |
| 4,818,905 | 4/1989 | Lender | 310/42 |

FOREIGN PATENT DOCUMENTS

| | | | |
|---|---|---|---|
| 2344193 | 3/1975 | Fed. Rep. of Germany | 29/596 |
| 55-2363 | 1/1980 | Japan | 29/596 |

Primary Examiner—Joseph M. Gorski
Assistant Examiner—Peter Dungba Vo
Attorney, Agent, or Firm—Mirek A. Waraksa

[57] ABSTRACT

Complementary laminations for a stator pole assembly and a cooperating rotor pole assembly of an electric motor or generator are produced simultaneously from a plate of magnetic material. The plate is stamped to produce an outer peripheral edge corresponding in shape to the exterior of an annular stator yoke and to produce a central aperture shaped to be received by an indexing element of an indexing table. The plate is then repeatedly indexed about its center in equal angular increments and a punch is displaced in a reciprocating rectilinear fashion synchronized with the indexing to punch a multiplicity of identical apertures equally-spaced circumferentially. The apertures are shaped to define internal edge surfaces in the plate corresponding in shape to radially inner surface of the stator yoke and to radially outer surfaces of a central hub of the rotor pole assembly and to define a multiplicity of identical radial webs. The multiplicity of webs is cut with a circular punch such that the plate is divided into a stator pole assembly lamination with radially-inward projections corresponding in shape to stator poles and a rotor pole assembly lamination with radially-outward projections corresponding in shape to rotor poles.

8 Claims, 3 Drawing Sheets

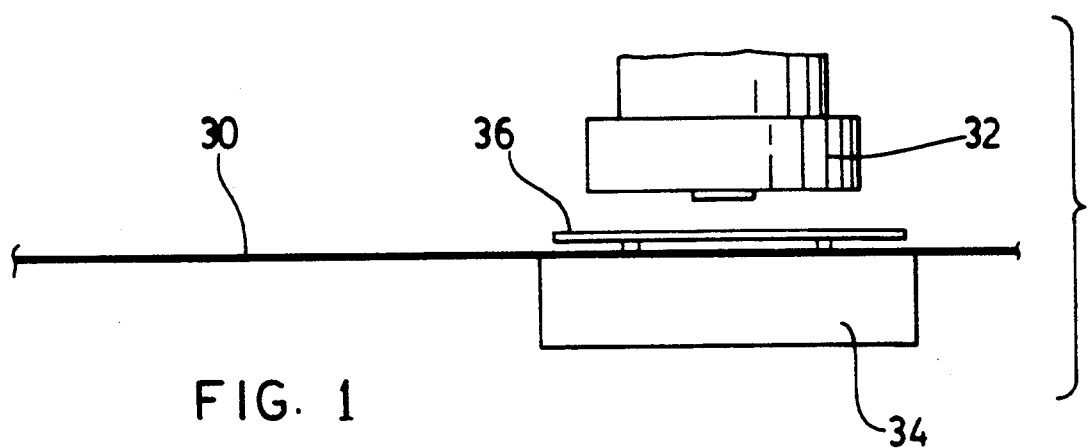
FIG. 1
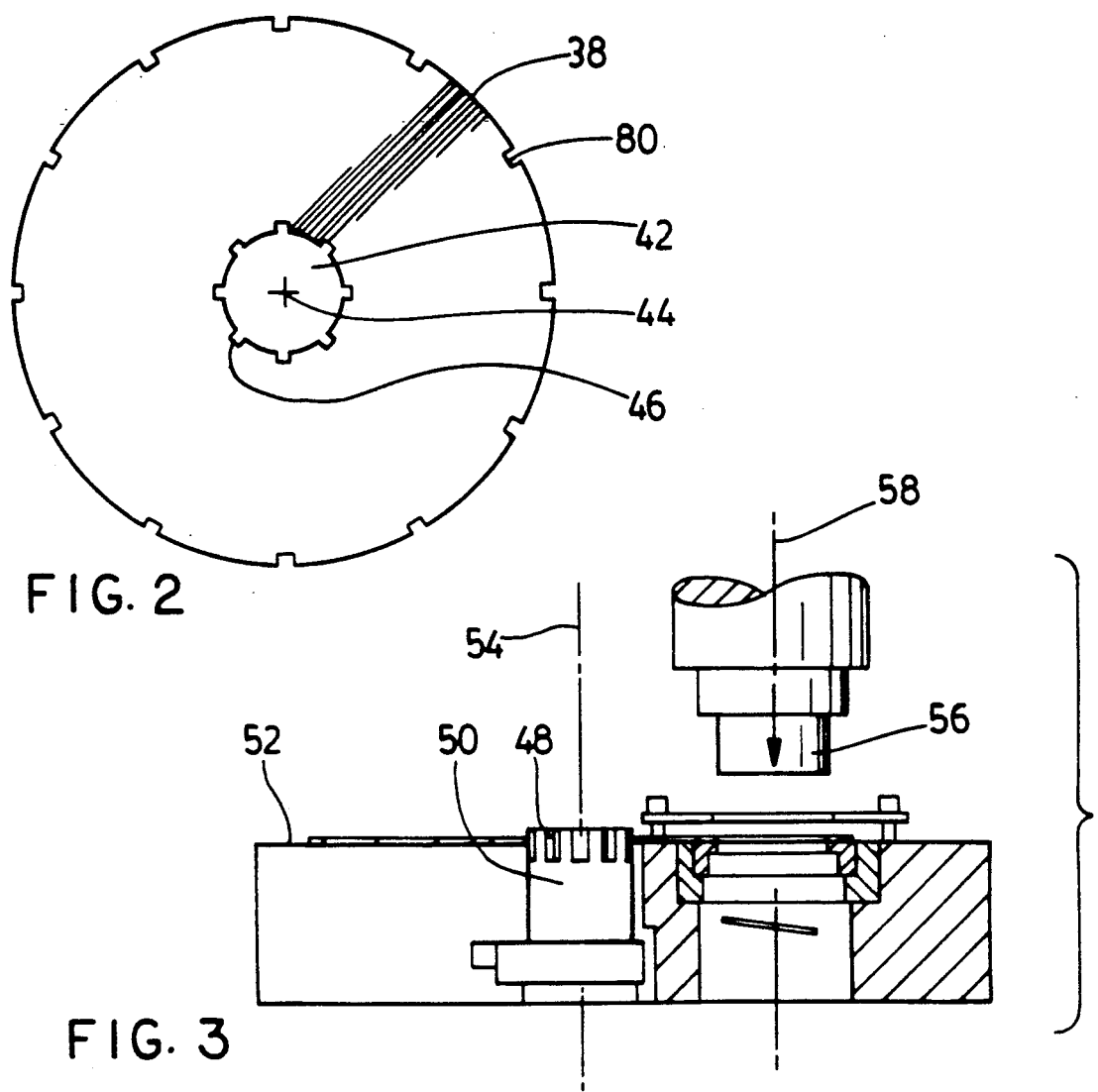
FIG. 2
FIG. 3

METHOD OF MAKING ROTOR AND STATOR POLE ASSEMBLIES BY STAMPING MAGNETIC PLATE

FIELD OF THE INVENTION

The invention relates to the construction of electric motors and generators, and, more particularly, to methods of manufacturing laminated stator and rotor pole assemblies for such machines.

BACKGROUND OF THE INVENTION

The invention has particular, though not exclusive, application to switched reluctance motors. Such motors generally comprise stator and rotor pole assemblies formed of laminated sheets of magnetic material, typically motor iron. For purposes of this specification, the term "magnetic material" should be understood as a material appropriate for conduction of the magnetic fluxes necessary for motor or generator operation.

Switched reluctance motors are constructed in a variety of configurations. A stator pole assembly may have several poles integrally formed with a yoke that serves to complete magnetic paths between the poles as well as providing structural support. Often the stator will be formed of several separate and distinct stator pole assemblies; that is, the stator has a multi-unit construction. Alternatively, the stator may have a single annular yoke to which all stator poles are attached. The rotor may have a central hub with rotor poles extending radially away from the hub. Alternatively, the rotor poles may be bars of magnetic material effectively embedded or fastened within a rotating support structure. The rotor and stator poles may be equal in number, but differences in number and consequently pitch are more common to permit self-starting of the motor.

Regardless of configuration, the rotor and stator pole assemblies will have a laminated construction to reduce eddy currents. The laminations are often made by stamping plates of magnetic material in an appropriate shape. The stamping process may require separate treatment for rotor and stator pole assemblies, the complexity of the operation being dependent in part on motor design. Complex progressive stamping may be required, and those skilled in the art will appreciate the very significant cost involved in providing appropriate stamping equipment.

Those skilled in the art will appreciate that there is little distinction in the general construction or configuration of motors and generators. The latter generally comprise stator and rotor laminations. The teachings of this specification, although focussed primarily on motors, should be understood as having application to the construction of both motors and generators (including alternators).

SUMMARY OF THE INVENTION

The invention provides inter alia a convenient method for making a stator pole assembly and a cooperating rotor pole assembly, particularly the laminations that constitute such motor or generator components. The method involves a combination of stator/rotor configuration and manufacturing steps that permit overall manufacture to be simplified. The configuration to be observed involves a stator assembly having an annular yoke and a multiplicity of poles directed radially-inwardly from the yoke, a rotor configuration having a central hub and a multiplicity of rotor poles directed raidally-outwardly from the hub, and equal numbers of rotor and stator poles. The method of the invention permits a sheet of magnetic material to be conveniently punched to define complementary pairs of stator and rotor laminations.

In one aspect, the invention provides a method of making a stator pole assembly and a cooperating rotor pole assembly which involves producing a predetermined number of complementary rotor and stator pole assembly laminations. Each complementary pair of laminations is produced by stamping a plate of magnetic material to define an outer peripheral edge corresponding in shape to the outer peripheral surface of an annular stator yoke and to define therein a central aperture, preferably with a single pass of an appropriate punch. The plate is punched to define a multiplicity of apertures of predetermined identical shape, equally spaced circumferentially and at a common radial distance from a center point of the plate. The predetermined shape is selected such that the apertures define internal edge surfaces in the plate corresponding in shape to radially inner surfaces of the stator yoke and to radially outer surfaces of a central hub of the rotor pole assembly. The apertures also define a multiplicity of identical radial webs equally-spaced circumferentially. The multiplicity of webs are stamped to produce a cut through each web with a common predetermined radius of curvature relative to the center point of the plate, preferably with a single circular punch. This results in the plate being divided into a stator pole assembly lamination with radially-inward projections corresponding in shape to required stator poles and a complementary rotary pole assembly lamination with radially-outward projections corresponding in shaped to the required rotor poles. To complete assembly, the stator pole assembly laminations are mounted in registration and in side-by-side relationship on an appropriate support structure (such as a cylindrical casing) to form the stator pole assembly. The rotor pole assembly laminations are mounted in registration and in side-by-side relationship on a support shaft extending through their central apertures to form the rotor pole assembly. The support shaft is mounted for rotation relative to the support structure with the rotor pole assembly positioned centrally within and substantially coplanar with the stator pole assembly.

In connection with the stamping of each plate to define its multiplicity of identical apertures, the central aperture punched into each plate may be shaped to interfit with an indexing element of an indexing table. Thereafter, a multiplicity of identical apertures are produced by repeatedly indexing the plate by preselected angular increments about a predetermined indexing axis through its center point, and producing a reciprocating rectilinear displacement of an appropriately configured punch along an axis parallel and offset from the indexing axis.

The advantage of the method of the invention is that complementawry stator and rotor pole assembly laminations can be produced very simply and without resort to more costly and complicated processes of progressive stamping. This ultimately reduces the cost of an electric motor or generator.

Other aspects of the invention will be apparent from a description below of a preferred embodiment and will be more specifically defined in the appended claims.

DESCRIPTION OF THE DRAWINGS

The invention will be better understood with reference to drawings in which:

FIG. 1 is a diagrammatic side elevational view of a first stage of a stamping process for producing complementary stator and rotor pole assembly laminations; and, FIG. 2 is a plan view of the product produced by the first stage of the process;

FIG. 3 is a diagrammatic side elevational view, partially cross-section, of apparatus for implementing a second stage of the process, involving repeated indexing and stamping of the product of the first stage;

DESCRIPTION OF PREFERRED EMBODIMENTS

Figure 7:
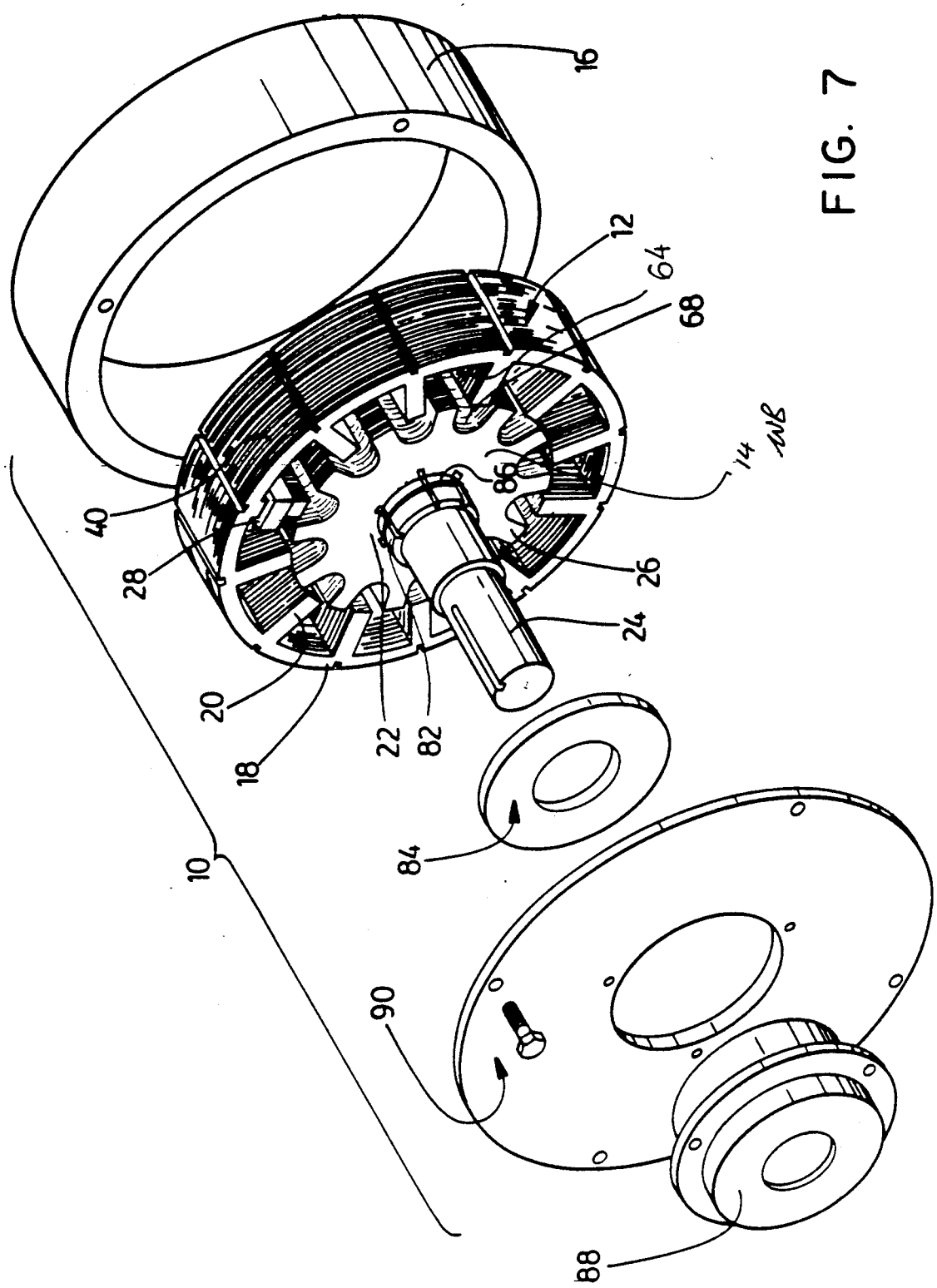

Reference is made to FIG. 7 which illustrates an exemplary switched reluctance motor 10 constructed according to the methods of the present invention. The motor 10 has been extensively fragmented to highlight its stator and rotor pole assemblies 12, 14, the more significant components of the present invention. The stator pole assembly 12 is mounted within an outer cylindrical casing 16 and comprises an annular yoke 18 with radially-inwardly directed poles (only one such pole 20 being specifically indicated) equally-spaced circumferentially about the interior of the yoke 18. The rotor pole assembly 14 is located substantially coplanar with the stator pole assembly 12. The rotor pole assembly 14 is mounted by means of its central apertured hub 22 to a rotatable shaft 24 for rotation relative to the stator pole assembly 12, as required for motor 10 operation, and has a multiplicity of rotor poles (only one rotor pole 26 being specifically indicated) which extend radially outwardly from the hub 22. It will be noted that there are equal numbers of rotor and stator poles with the same pitch (angular separation). Coils are mounted on the stator poles, such as the exemplary coil 28, and appropriate controls are provided to switch current flows to produce motor action.

What is illustrated is in fact a single stage motor which would require a starter motor. However, self-starting may be provided by using a multi-stage construction, each stage being substantially identical to and axially aligned with the stage illustrated, and arranging for the rotor or stator poles of successive stages to be angularly offset so that at least one stage is capable of providing motor action at any given time. Other details regarding construction and operation of such a motor 10 will be readily apparent to those skilled in the art and will not be described.

As apparent in FIG. 7, both the stator and rotor pole assemblies have a laminated construction. The first stage of an exemplary process for producing the required laminations will be described with reference to FIGS. 1 and 2. A plate 30 of magnetic material is supplied to a stamping machine. The plate 30 is positioned between a punch 32 and a complementary die 34, and below a conventional stripping plate 36 that ensures separation of the plate 30 from the punch 32. The punch 32 is shaped so that a single pass against the motor 10 material imparts an outer peripheral edge 38 corresponding in shape to the outer peripheral surface 40 of the yoke 18 and also defines a central aperture 42, as apparent in FIG. 2, where the plate 30 as processed to this stage is shown. The central aperture 42 is centered about the center point 44 of the plate 30 and may be seen to comprise a multiplicity of recesses equally spaced about its periphery, only one such recess being specifically indicated with reference numeral 46. These recesses are complementary to splines (such as the spline 48) formed on the exterior of an indexing element 50 of a conventional indexing table 52.

The plate 30 is then mounted on the indexing table 52 with the indexing element 50 operatively located within the central aperture 42 of the plate 30, as apparent in FIG. 3. The plate 30 is indexed about an indexing axis 54 through the center point 44 of the plate 30 in equal angular increments (30 degrees in this particular embodiment of the invention). A punching element 56 is supported for reciprocating rectilinear movement along an axis 58 parallel to and offset from the indexing axis 54. In response to each indexing of the plate 30, the punching element 56 is driven against the plate 30 and a complementary die to produce an aperture of a predetermined shape, roughly a rounded, pie-shaped sector. An aperture indicated with the reference numeral 60 is exemplary. The synchronizing of the displacement of the punching element 56 with the indexing of the plate 30 is conventional and will consequently not be described further.

Figure 4:
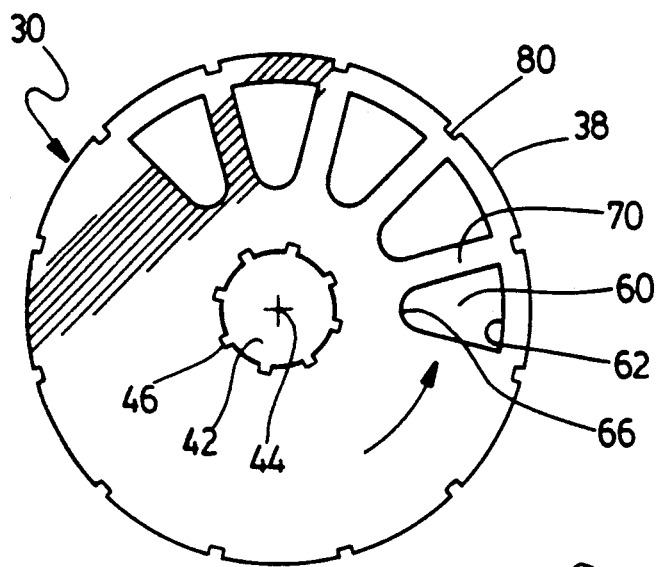
FIG. 4 is a plan view of the partially-completed product of the second stage of operation.

The indexing and punching continue until twelve identical apertures, equally spaced circumferentially at a common radial distance from the center point 44 of the plate 30 are produced. It should be noted that the shape of the apertures is such that they define internal edge surfaces in the plate 30 corresponding in shape to the radially inner surfaces of the stator yoke 18 and the radially outer surfaces of the central hub 22 of the rotor pole assembly 14. One exemplary internal edge surface 62 (indicated in FIG. 4) corresponds to a radially inner surface 64 (indicated in FIG. 7) of the stator yoke 18. An exemplary internal edge surface 66 (indicated in FIG. 4) corresponds to a radially outer surface 68 (indicated in FIG. 7) of the central hub 22. The apertures are otherwise shaped to define twelve identical radial webs equally-spaced circumferentially and each having largely parallel side edges. One such web is specifically indicated with reference numeral 70 in FIGS. 4–5. These webs will ultimately constitute lamination portions corresponding to rotor and stator poles.

Figure 5:
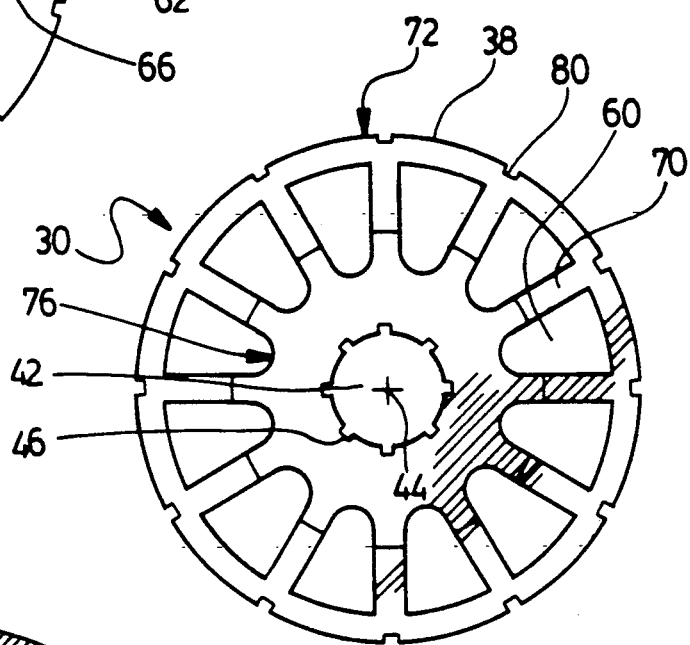
FIGS. 5 and 6 are plan views showing the finished pair of complementary laminations after a final stamping process; and, FIG. 7 is an exploded perspective view indicating the general configuration of an exemplary electric motor incorporating stator and rotor pole assemblies constructed according to the invention.
Figure 6:
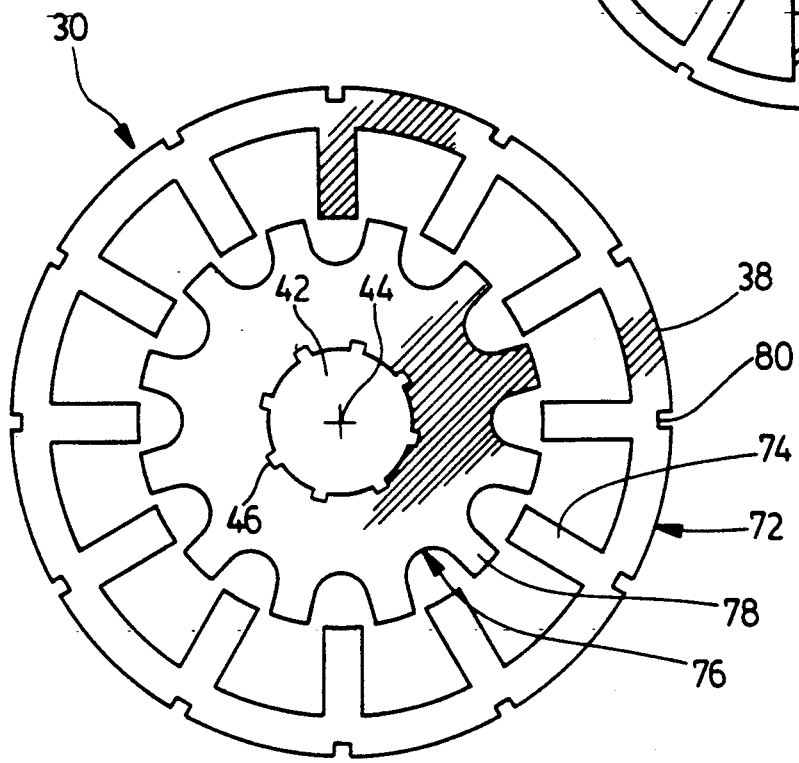

The plate 30 is then punched with a circular punch to produce the plate configuration apparent in FIG. 5. Since such punching is entirely conventional, the punching element and complementary die required for such purposes have not been illustrated. This punching step produces a cut through each web at a common predetermined radius of curvature relative to the center point 44 of the plate 30, all webs being cut simultaneously in this particular embodiment of the invention. The common radius of curvature of the cuts ensures that the rotor will be configured to rotate freely within the stator. This also divides the plate 30 into a stator pole assembly lamination 72 with radially-inward projections (such as the projection 74 indicated in FIG. 6) that correspond in shape to the required stator poles and a complementary rotor pole assembly lamination 76 with radially outward projects (such as the projection 78 indicated in FIG. 6) that correspond in shape to the required rotor poles. It will be apparent that the punching process can easily be adapted to produce any required clearance (air gap) between stator and rotor poles in the resulting motor.

The process steps described above are repeated until a desired number of complementary laminations are produced. The stator pole assembly laminations are then registered in side-by-side relationship (the orientation of FIG. 7). They may be held in such an orientation in an appropriate jig and welded permanently together. The recesses in the outer peripheral edge of the stator laminations (such as the exemplary recess 80 indicated in FIGS. 2-6) align to define channels along which weld beads can conveniently be provided. Also, an elongate key-like bridging element (not illustrated) can be placed in each such channel to span the distance between the stator pole assembly 12 and the outer casing 16 to permit the stator pole assembly 12 to be fixed relative to the outer casing 16 by appropriate welding of the bridging element. Any appropriate means can be used, however, to keep the laminations in registration and to mount the stator pole assembly 12 to the casing 16.

The rotor pole assembly laminations are registered and mounted in side-by-side relationship on the support shaft 24 as in FIG. 7. The recesses associated with their central apertures are aligned and used to key the assembly onto the support shaft 24 for rotation with the shaft 24. More specifically, the rotor pole assembly laminations are fitted onto an enlarged portion 82 of the shaft 24, formed with several longitudinal key channels. They are retained in such a configuration at opposite ends thereof by a pair of retaining plates (only one such retaining plate 84 being apparent in FIG. 7) which are apertured to fit about the enlarged portion 82 of the shaft 24. The plate 84 may have an internal spring-biased key (not illustrated) which fits into a circular groove 86 formed in the enlarged portion 82 of the shaft 24 or alternatively a C-ring or other fastening means (not illustrated) can be used (with the position of the circular groove 86 adjusted accordingly). These matters are conventional and will not be described further. The shaft 24 is bearing mounted in a conventional manner by a pair of bearing (such as the exemplary bearing 88), the bearings being bolted to a pair of opposing end plates (such as the plate 90) fitted to the axially-opposite ends of the casing 16. Other details regarding assembly of the motor 10 are conventional and will not be descirbed.

It will be appreciated that a particular embodiment of the invention has been described and that modifications may be made therein without departing from the spirit of the invention or necessarily departing from the scope of the appended claims. A variety of modifications to the process might be considered. For example, rather than using a circular die to cut the webs, the punch otherwise used to produce the multiplicity of pie-shaped apertures may simultaneously cut one of the webs as each new apertured is punched.

I claim:

1. A method of making a stator pole assembly and a cooperating rotor pole assembly for an electric motor or generator, comprising:

producing a predetermined number of complementary rotor and stator pole assembly laminations by repeating the following steps:

A. providing a plate of magnetic material,

B. stamping the plate thereby defining an outer peripheral edge corresponding in shape to an outer peripheral surface of an annular stator yoke, C. stamping the plate thereby defining a central aperture centered about a center point of the plate, D. stamping the plate thereby defining a multiplicity of apertures of predetermined identical shape equally-spaced circumferentially and at a common radial distance from the center point of the plate, the predetermined shape being selected such that the multiplicity of apertures define internal edge surfaces in the plate corresponding in shape to radially inner surfaces of the stator yoke and to radially outer surfaces of a central hub of the rotor pole assembly and define a multiplicity of identical radial webs equally-spaced circumferentially, and E. stamping the multiplicity of webs thereby producing a cut through each web with a common predetermined radius of curvature relative to the center point of the plate such that the plate is divided into a stator pole assembly lamination with radially-inward projections corresponding in shape to stator poles and a rotor pole assembly lamination with radially-outward projections corresponding in shape to rotor poles;

mounting the stator pole assembly laminations registered and in side-by-side relationship on a support structure thereby forming the stator pole assembly;

mounting the rotor pole assembly laminations registered and in side-by-side relationship on a support shaft extending through the central apertures of the rotor pole assembly laminations thereby forming the rotor pole assembly;

mounting the support shaft for rotation relative to the support structure with the rotor pole assembly positioned centrally within and substantially coplanar with the stator pole assembly.

2. The method of claim 1 in which:

the stamping in step C further comprises shaping the central aperture of the plate such that the plate interfits with an indexing element of an indexing table; and, the stamping in step D comprises providing a punch shaped to produce apertures of the predetermined shape, interfitting the plate with the indexing element of the indexing table and repeatedly indexing the plate by preselected angular increments about a predetermined indexing axis through the center point of the plate, and producing a reciprocating rectilinear displacement of the punch synchronized with the indexing of the plate and directed along an axis parallel to and offset from the indexing axis.

3. The method of claim 2 comprising providing a punch having stamping surfaces corresponding in shape both to the outer peripheral surface of the stator yoke and to the central aperture and performing the stamping in steps B and C with a single pass of the punch against the plate.

4. A method of making a stator pole assembly and a cooperating rotor pole assembly, comprising:

producing a predetermined number of complementary rotor and stator pole assembly laminations by repeating the following steps:

A. providing a plate of magnetic material,

B. stamping the plate with a single pass of a first stamping element thereby defining an outer peripheral edge corresponding in shape to an outer peripheral surface of an annular stator yoke and a central aperture centered about a central point of the plate and having a shape complementary to an indexing element of an indexing table;

C. mounting the plate on the indexing table with the indexing element operatively located within the central aperture and repeatedly indexing the plate in equal angular increments about a predetermined indexing axis through the center point of the plate;

D. stamping the plate with a second stamping element supported for reciprocating rectilinear movement along an axis parallel to and offset from the indexing axis in response to indexing of the plate such that a multiplicity of identical apertures of a predetermined shape are formed in the plate, equally spaced circumferentially and at a common radial distance from the center point of the plate, the predetermined shape being selected such that the multiplicity of apertures defines internal edge surfaces in the plate corresponding in shape to radially inner surfaces of the stator yoke and radially outer surfaces of a central hub of the rotor and define a multiplicity of identical radial webs equally-spaced circumferentially, and E. stamping the multiplicity of webs thereby producing a cut through each web with a common predetermined radius of curvature relative to a center point of the plate such that the plate is divided into a stator pole assembly lamination with radially-inward projections corresponding in shape to stator poles and a rotor pole assembly lamination with radially-outward projections corresponding in shape to rotor poles;

mounting the stator pole assembly laminations registered and in side-by-side relationship on a support structure thereby forming the stator pole assembly;

mounting the rotor pole assembly laminations registered and in side-by-side relationship on a support shaft extending through the central apertures of the rotor pole assembly laminations thereby forming the rotor pole assembly;

mounting the support shaft for rotation relative to the support structure with the rotor pole assembly positioned centrally within and substantially coplanar with the stator pole assembly.

5. A method of making laminations for a stator pole assembly and a cooperating rotor pole assembly, comprising:

A. providing a plate of magnetic material,

B. stamping the plate thereby defining an outer peripheral edge corresponding in shape to an outer peripheral surface of an annular stator yoke;

C. stamping the plate thereby defining a central aperture centered about a center point of the plate;

D. stamping the plate thereby defining a multiplicity of apertures of predetermined identical shape equally-spaced circumferentially and at a common radial distance from the center point of the plate, the predetermined shape being selected such that the multiplicity of apertures define internal edge surfaces in the plate corresponding in shape to radially inner surfaces of the stator yoke and to radially outer surfaces of a central hub of the rotor pole assembly and define a multiplicity of identical radial webs equally-spaced circumferentially; and, E. stamping the multiplicity of webs thereby producing a cut through each web with a common predetermined radius of curvature relative to the center point of the plate such that the plate is divided into a stator pole assembly lamination with radially-inward projections corresponding in shape to stator poles and a rotor pole assembly lamination with radially-outward projections corresponding in shape to rotor poles.

6. The method of claim 5 in which:

the stamping in step C comprises shaping the central aperture such that the plate interfits with an indexing element of an indexing table;

the stamping in step D comprises providing a punch shaped to produce apertures of the predetermined shape, interfitting the plate with the indexing element of the indexing table and repeatedly indexing the plate by preselected angular increments about a predetermined indexing axis through the center point of the plate, and producing a reciprocating rectilinear displacement of the punch synchronized with the indexing of the plate and directed along an axis parallel to and offset from the indexing axis.

7. The method of claim 6 comprising providing a punch having stamping surfaces corresponding in shape both to the outer peripheral surface of the stator yoke and to the central aperture, and performing the stamping in steps B and C with one pass of the punch against the plate.

8. A method of making laminations for a stator pole assembly and a cooperating rotor pole assembly, comprising:

providing a plate of magnetic material, stamping the plate with a single pass of a first stamping element thereby defining an outer peripheral edge corresponding in shape to an outer peripheral surface of an annular stator yoke and a central aperture centered about a center point of the plate having a shape complementary to an indexing element of an indexing table;

mounting the plate on the indexing table with the indexing element operatively located within the central aperture and repeatedly indexing the plate about a predetermined indexing axis by equal angular increments;

stamping the plate with a second stamping element supported for reciprocating rectilinear movement along an axis parallel to and offset from the indexing axis in response to indexing of the plate such that a multiplicity of identical apertures of a predetermined shape are formed in the plate, equally-spaced circumferentially and at a common radial distance from the indexing axis, the predetermined shape being selected such that the multiplicity of apertures define internal edge surfaces in the plate corresponding in shape to radially inner surfaces of the stator yoke and to radially outer surfaces of a central hub of the rotor pole assembly and define a multiplicity of identical radial webs equally-spaced circumferentially; and stamping the multiplicity of webs therebhy producing a cut through each web with a common predetermined radius of curvature relative to the center point of the plate such that the plate is divided into a stator pole assembly lamination with radially-inward projections corresponding in shape to stator poles and a rotor pole assembly lamination with radially-outward projections corresponding in shape to rotor poles.

* * * * *